UNITED STATES PATENT OFFICE 2,485,080

COLLOIDAL MELAMINE-UREA-FORMALDE-HYDE COPOLYMER SOLUTIONS

Henry P. Wohnsiedler, Darien, and Walter M Thomas, Stamford, Conn., assignors to American Cyanamid Company, New York, N. Y., a corporation of Maine No Drawing. Original application January 4, 1944, Serial No. 516,932. Divided and this application March 9, 1949, Serial No. 80,578

1 Claim. (Cl. 260—29.4)

This invention relates to resinous copolymers of melamine and urea with formaldehyde in the form of colloidal aqueous solutions. The invention includes the resin solutions themselves, their methods of preparation, cured resins obtained therefrom and preferred modes of application of the colloidal resin to other substances.

We have discovered that copolymer resins can be prepared from melamine, urea and formaldehyde in the form of colloidal aqueous solutions wherein the resin has a number of unusual and extremely important properties. One of the principal characterizing features of our new copolymer resin solutions is the fact that a positive electrical charge is carried by dispersed particles thereof, as shown by their migration toward the cathode upon electrophoresis of the solution. Another important advantage resides in the fact that the dispersed resin copolymer is in a partially polymerized condition and can therefore be completely and rapidly cured in a relatively short period of time after it has been deposited by absorption, adsorption, electrodeposition, ion exchange, drying, precipitation or otherwise.

In order to produce the colloidally dispersed, cationic copolymer resins of our invention we first prepare an acidified aqueous solution of formaldehyde condensation product of melamine and urea containing at least about 0.7–1 mol of melamine for each 4 mols of urea and convert the resin into the desired colloidal copolymer by aging the solution. The term "formaldehyde condensation product of melamine and urea" includes condensation products prepared by any one or more of the following procedures:

(a) Co-reacting melamine, urea and formaldehyde simultaneously.

(b) Mixing substantially monomeric monomethylol or dimethylol urea with solutions of methylol melamines containing 2 to 6 mols of combined formaldehyde.

(c) Reacting urea, melamine and aqueous formaldehyde in the presence of acetic acid.

We have found that wide variations in the properties of the melamine-urea-formaldehyde copolymers can be obtained by varying the ratio of urea to melamine, and it is an important advantage of the invention that the urea content can be varied in this manner throughout an extremely wide range. Although at least about 15–20 mol percent of the total quantity of melamine+urea must be present as melamine, the quantity of urea may vary from this maximum to as low as 1% if desired while still retaining the advantages of the invention. It is therefore possible to obtain melamine-urea-formaldehyde copolymers in the form of colloidal aqueous solutions which possess most of the desirable properties of colloidal cationic melamine-formaldehyde resin solutions, but which are much cheaper because they contain a major percentage of urea and only a relatively small quantity of melamine. Thus, for example, we have found that a formaldehyde condensation product containing 70 mol percent of urea and only 30 mol percent of melamine will form a colloidal cationic solution.

Our present invention is directed specifically to those colloidal aqueous solutions of melamine-urea-formaldehyde copolymers which contain acetic acid as the acidifying agent. Colloidal solutions of this copolymer resin that are acidified with hydrochloric acid are described and claimed in our copending application Serial No. 516,932, filed January 4, 1944, from which the subject matter of this application has been divided.

The copolymer solutions of our present invention differ from the corresponding colloidal solutions prepared by using hydrochloric or other mineral acids in the minimum and maximum amounts of acid that can be used. Considerably higher quantities on the order of 1.5 mols of acetic acid per mol of melamine must be employed, whereas the colloidal copolymer is formed in a 10% aqueous solution when as little as about 0.2 mol of hydrochloric acid per mol of melamine is used. On the other hand the desired colloid is not formed when more than about 2.5 mols of hydrochloric acid per mol of melamine are present, whereas colloidal solutions that are stable and useful can be obtained by using 6 mols of acetic acid for each mol of melamine. At the resin solids concentrations ordinarily used these ratios of acetic acid correspond to a pH range of about 3 to 4.

The colloidal resin solutions prepared with acetic acid also distinguish from the hydrochloric acid solutions of our copending application in their field of utility. Whereas the hydrochloric acid solutions are particularly useful in the manufacture of wet strength paper, the colloids of the present invention are particularly adapted for the treatment of textiles and allied materials. Thus, for example, they may be used to impregnate textiles of cotton, viscose or other types of regenerated cellulose such as spun rayon and the like either to flame-proof the woven cloth or to function as an anchorage or binding agent for such diverse materials as starch, water-repellents such as aluminum formate-acetate solutions, dyestuffs and the like. The colloidal copolymer solutions of the present invention may also be airdried to form clear, hard resin films. They may be applied to sheets of paper as a laminating resin or to plywood as an adhesive, and in both cases the resin can be cured after lamination in a short time and at very moderate curing temperatures.

The aging time of the acidified aqueous solutions of melamine-urea-formaldehyde condensation product will vary both with the quantity of acid used and with the temperature. At elevated temperatures the aging time is greatly reduced, but in this respect the copolymer resins are not as sensitive as are the corresponding acidified solutions of melamine-formaldehyde resin and the aging may be conducted by refluxing the solution if desired. However, it is much simpler and greatly preferable to age the solutions at ordinary room temperatures of about 25–30° C. or at only slightly elevated temperatures, since the degree of polymerization may be much more closely controlled. When the desired colloidal condition has been obtained in the solution the polymerization may be checked by cooling or by dilution with water, or both.

The colloidal aqueous solutions of melamine-urea-formaldehyde copolymers of the present invention are identified by the following properties: they possess a blue colloidal haze and exhibit a definite Tyndall effect under the influence of a beam of light or in the darkfield microscope. Particles of the dispersed copolymer resin appear to be ionized in solution and possess definite cationic properties as shown by their migration toward the cathode upon the passage of a direct current of electricity through the solution, and under the proper conditions the resin may be actually electroplated by this method. The colloidal resin solutions are indefinitely dilutable with water and may also be diluted with small quantities of acid having a strength equivalent to the acid already present, but the colloid is precipitated by the addition of even small quantities of stronger acids such as 6 normal hydrochloric acid and this constitutes a very delicate test to determine when the colloidal copolymer resin has been formed in the solution. The colloid is also precipitated by the addition of alkalies such as caustic soda and electrolytes such as aluminum sulfate, sodium chloride and the like.

Although our invention is not limited by any theory of the reaction involved, we offer the following as a probable explanation of the formation of the colloidal resin copolymer solutions which have been described. It is a known fact that both melamine-formaldehyde condensation products and urea-formaldehyde condensation products will undergo a progressive polymerization from the substantially monomeric form in which they are first obtained to a polymerized condition in which they are insoluble in water. Syrups prepared by reacting either melamine or urea with aqueous formaldehyde solutions are said to be hydrophobe when this polymerization has progressed to the stage where the addition of substantial quantities of water will cause a precipitation of the resin. We believe that although a change similar to the formation of a hydrophobe syrup may take place during the aging of the acid solutions of melamine-urea-formaldehyde condensation products which we have described, the free acid present prevents the resin from becoming hydrophobic. The molecules of the condensation product are therefore retained in a soluble condition in which they are free to continue the process of combining with each other, and therefore attain a degree of polymerization sufficient to render the resin particles colloidal in character and size. This polymerization continues during further aging of the colloidal solution until the resin eventually forms a thixotropic gel, which is finally converted into the water-insoluble stage by further reaction.

The invention will be further illustrated by the following specific examples. It should be understood, however, that these examples are given primarily for purposes of illustration and that the invention in its broader aspects is not limited thereto.

*Example 1*

Neutral melamine-urea-formaldehyde syrups were prepared in which the ratio of urea to melamine was varied in steps of 10 mol percent. An all-melamine-formaldehyde syrup and an all-urea-formaldehyde syrup were also made to complete the series. The syrups were numbered as follows:

| Syrup No. | Mol Per Cent Melamine | Mol Per Cent Urea |
|---|---|---|
| 1 | 10 | 90 |
| 2 | 20 | 80 |
| 3 | 30 | 70 |
| 4 | 40 | 60 |
| 5 | 50 | 50 |
| 6 | 60 | 40 |
| 7 | 70 | 30 |
| 8 | 80 | 20 |
| 9 | 90 | 10 |
| 10 | 100 | None |
| 11 | None | 100 |

In all the melamine-urea condensation products the quantity of formaldehyde was equal to 3 mols for each mol of melamine plus 2 mols for each mol of urea and the reaction was conducted in the following manner. The pH of each slurry was adjusted to 7.2 after which it was heated at 70° C. until the first hydrophobe was reached. In syrups Nos. 2–9 inclusive this took place in 25 to 35 minutes heating with the mixtures of higher urea content requiring the longer time. Syrup No. 1 required 85 minutes heating.

Syrup No. 11 was made by refluxing 2 mols of neutralized formalin with 1 mol of urea.

Syrup No. 10 was prepared by heating a mixture of 1 mol of melamine and 3 mols of 37% aqueous formaldehyde neutralized with NaOH to a pH of 7.2 for 30 minutes at 60° C.

Each syrup was divided into a number of portions, which were dissolved in water containing varying amounts of acetic acid. All the solutions were made to contain 10% resin solids and were aged at 25–30° C.

White precipitates were formed immediately in all the solutions of syrup No. 1 and syrup No. 11. All the solutions of syrup No. 2 containing more than 2 mols of acetic acid for each mol of melamine remained clear and developed a blue colloidal haze upon further aging. A blue colloidal haze also formed in those solutions of syrups Nos. 3 to 10 that contained about 2 or more mols of acetic acid per mol of melamine.

These results show that copolymers containing up to slightly less than 80 mol percent of urea will dissolve to clear solutions in water containing a minimum of about 1.5–2 mols of acetic acid per mol of melamine. These clear solutions are converted on aging to the blue colloidal solutions in which the colloidal resin particles possess cationic properties.

*Example 2*

(1) A melamine-urea-formaldehyde condensation product was made by adding 0.7 gram mol of melamine and 0.3 gram mol of urea to 4.0 gram mols of aqueous 37% formaldehyde, diluting to 10% resin solids with water containing 2.1 gram mols of acetic acid, and heating at reflux temperature for three hours. The resin then contained 2.5 mols of combined formaldehyde.

(2) Another colloidal resin solution was made by reacting 0.7 gram mol of melamine and 0.3 gram mol of urea with 6 gram mols of 37% aqueous formaldehyde, diluting to 10% resin solids with water containing 2.1 gram mols of acetic acid and aging for 6 days at 25° C. The final content of combined formaldehyde was 3.3 mols.

(3) A resin syrup was prepared by refluxing 0.3 gram mol of melamine, 0.7 gram mol of urea and 4.0 gram mols of aqueous formaldehyde to the first hydrophobe, diluting to 10% solids with water containing 0.9 gram mol of acetic acid, and refluxing four hours. The colloid then contained 1.7 mols of combined formaldehyde.

(4) The procedure of (3) was repeated, but 0.3 gram mol of melamine, 0.7 gram mol of urea and 6 gram mols of 37% aqueous formaldehyde were used. The copolymer syrup was diluted to 10% solids with water and acidified with 0.9 mol of acetic acid and aged six days at 25° C. The combined formaldehyde in the copolymer was 2.2 mols.

The aged melamine-urea-formaldehyde copolymers can therefore be prepared with a content of from about 1 to 4 mols of combined formaldehyde for each mol of melamine+urea, depending on the ratio of melamine to urea and the quantity of formaldehyde used.

Example 3

A condensation product of 3 mols of urea, 2 mols of melamine and 12 mols of 37% aqueous formaldehyde was prepared by heating the reagents together for 80 minutes on a water bath at 60° C. Portions were acidified with acetic acid and aged at room temperature at 10% solids and at 50% solids. The results were as follows:

Solution No. 1, containing 2 mols of acid per mol of melamine, was aged at 50% solids. The pH was 4.0.

Solution No. 2, containing 6 mols of acid per mol of melamine, was also aged at 50% solids, after which the pH was 3.6. Both of these solutions were viscous, becoming blue if heated.

Solution No. 3, aged at 10% resin solids, contained 6 mols of acid per mol of melamine and had a pH of 3.2. The solution developed the blue haze characteristic of the colloidal condition after 2–3 hours; it was stable for more than 2 weeks.

A sample of solution No. 1 was flowed out on a glass panel and formed a clear, hard film on drying. Samples of solutions Nos. 1 and 2 were applied to sheets of laminating paper which were then pressed together for 15–60 minutes under 1200 lbs./sq. in. pressure. The laminated product showed good adhesion and low water absorption.

Solutions Nos. 1 and 3 were applied to cotton fabric as a size and the fabric was then dried and heated to cure the resin. The treated fabric was tested for flame propagation, and it was found that the resin possessed good flameproofing properties.

Birch veneer strips were coated on each side with solution No. 8 and were then pressed with the two outer plies having their grain direction at right angles to that of the center ply. Pressing was done cold for about one hour at 300 pounds per square inch. The plywood was found to have excellent wet and dry shear strength.

What we claim is:

A colloidal aqueous solution of a resinous copolymer of melamine, urea and formaldehyde which contains 1 to 70 mol percent of urea and 30 to 99 mol percent of melamine and about 1 to 4 mols of combined formaldehyde for each mol of melamine+urea, said solution being acidified to a pH within the range of about 3–4 by a content of from 1.5 to 6 mols of acetic acid for each mol of melamine, said resinous copolymer having a degree of polymerization such that the dispersed particles thereof are colloidal in character and size.

HENRY P. WOHNSIEDLER.
WALTER M. THOMAS.

No references cited.